United States Patent [19]

Liu

[11] Patent Number: 5,582,421
[45] Date of Patent: Dec. 10, 1996

[54] GOLF CART

[76] Inventor: John S. Liu, P.O. Box 82-144, Taipei, Taiwan

[21] Appl. No.: 543,529

[22] Filed: Oct. 16, 1995

[51] Int. Cl.$^6$ ................................................. B62B 1/12
[52] U.S. Cl. ...................... 280/646; 280/652; 280/655; 280/DIG. 6
[58] Field of Search .................. 280/DIG. 6, 646, 280/652, 655, 655.1

[56] References Cited

U.S. PATENT DOCUMENTS 5,143,399  9/1992  Liu ..................................... 280/DIG. 6

FOREIGN PATENT DOCUMENTS 166283  12/1955  Australia .......................... 280/DIG. 6
679485  9/1952  United Kingdom .............. 280/DIG. 6

*Primary Examiner*—Eric D. Culbreth
*Attorney, Agent, or Firm*—Alfred Lei

[57] ABSTRACT

A golf cart including an upper rod with a handle grip, a pivot joint including an upper member, a lower member and a U-shaped rod, a lower rod locked into the pivot joint, a fixed seat including an integral body having a rectangular portion formed with a vertical opening for fixedly engaging a lower end of the lower rod, an axle member connected to the first and second levers and having a pivot seat on which there is a shaft, a reinforcing plate, and a cylindrical portion, and a supporting seat fixedly mounted on a lower end of the lower rod and having two webs with a threaded hole for engaging the lower rod, a horseshoe shaped receiving plate and a curved stop between the web and the receiving plate.

1 Claim, 8 Drawing Sheets

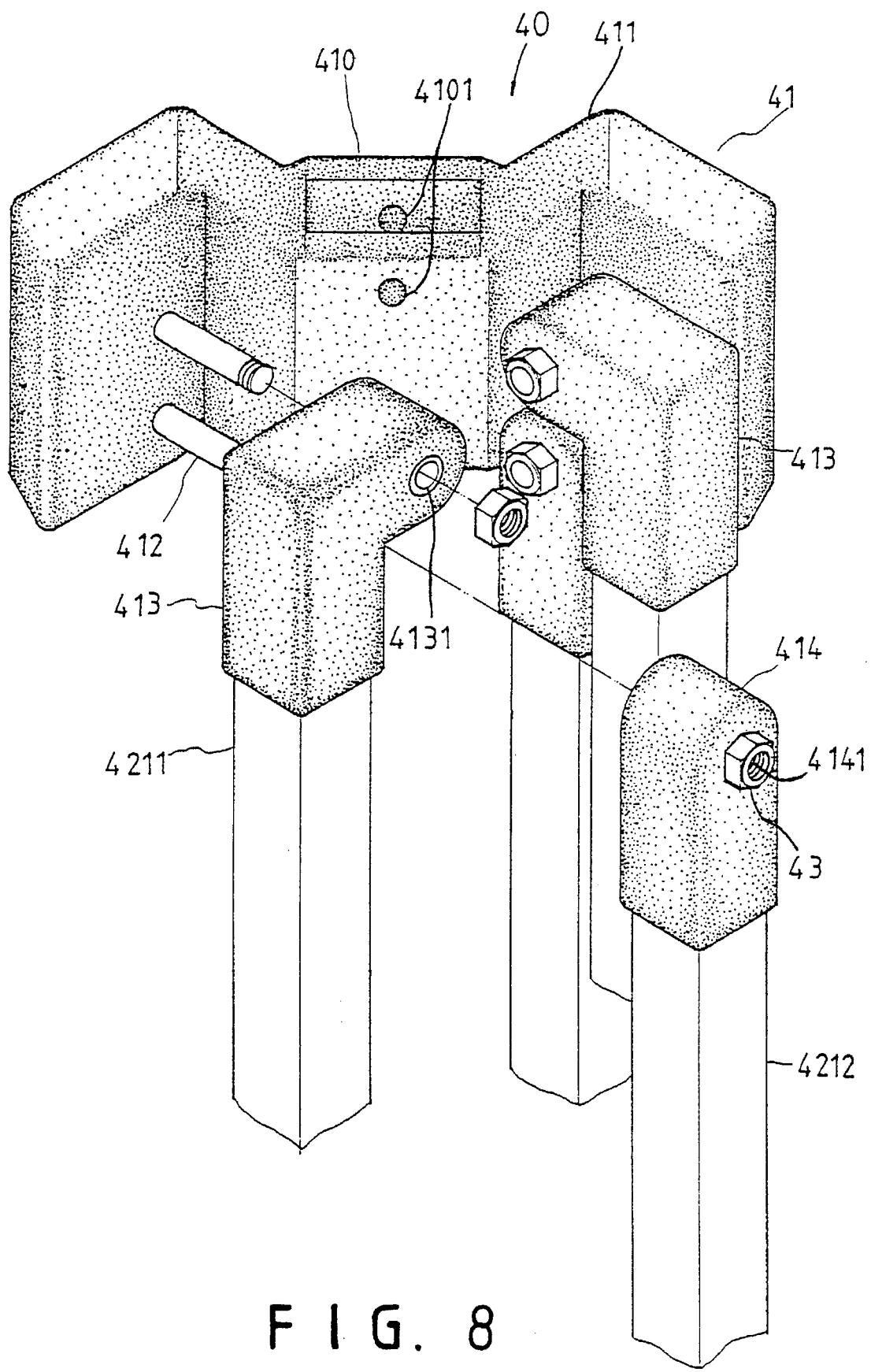
F I G. 8

5,582,421

GOLF CART

BACKGROUND OF THE INVENTION

1. Field of the Invention

This invention relates to an improved golf cart.

2. Description of the Prior Art

According to the U.S. Pat. No. 5,143,399, the fixed member are simply mounted on a lower rod by screws or rivets. Further, the fixed member is provided with two pivot portions each connected with a wheel by a linking rod. However, such a fixed member is easily deformed thereby biasing the position of the linking rod and therefore making the wheels difficult to rotate.

Therefore, it is an object of the present invention to provide a golf cart with an improved fixed seat which can obviate and mitigate the above-mentioned drawbacks.

SUMMARY OF THE INVENTION

This invention relates to an improved golf cart.

It is the primary object of the present invention to provide a golf cart which is of a long service life.

It is another object of the present invention to provide a golf cart which is easy to assemble.

It is still another object of the present invention to provide a golf cart which is low in cost.

It is still another object of the present invention to provide a golf cart which facilitates manufacture.

It is a further object of the present invention to provide a golf cart which is fit for practical use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 8 is an exploded view of the fixed seat.

DETAILED DESCRIPTION OF THE PREFERRED EMBODIMENT

Figure 1:
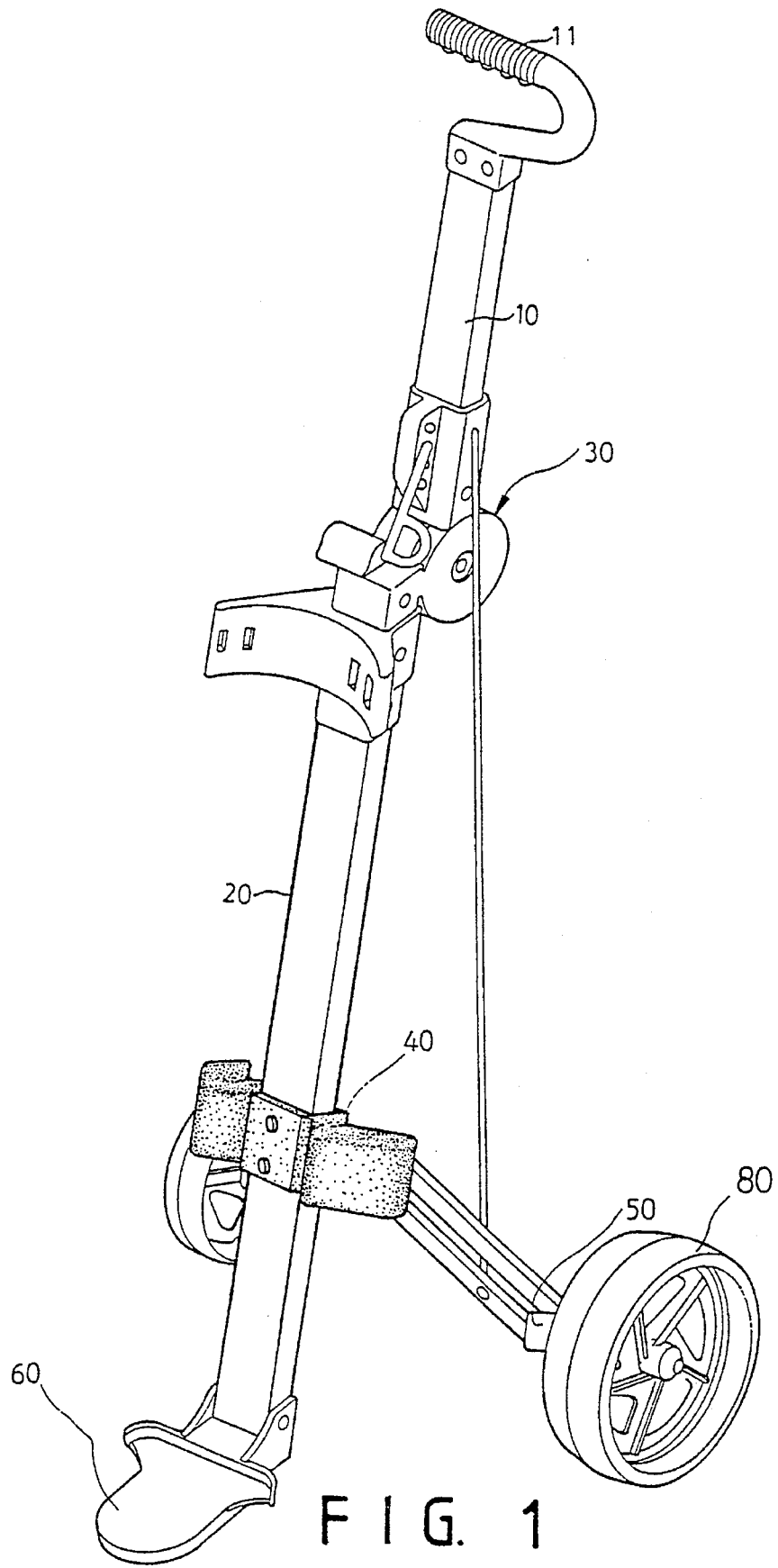
FIG. 1 is a perspective view of a golf cart according to the present invention.

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
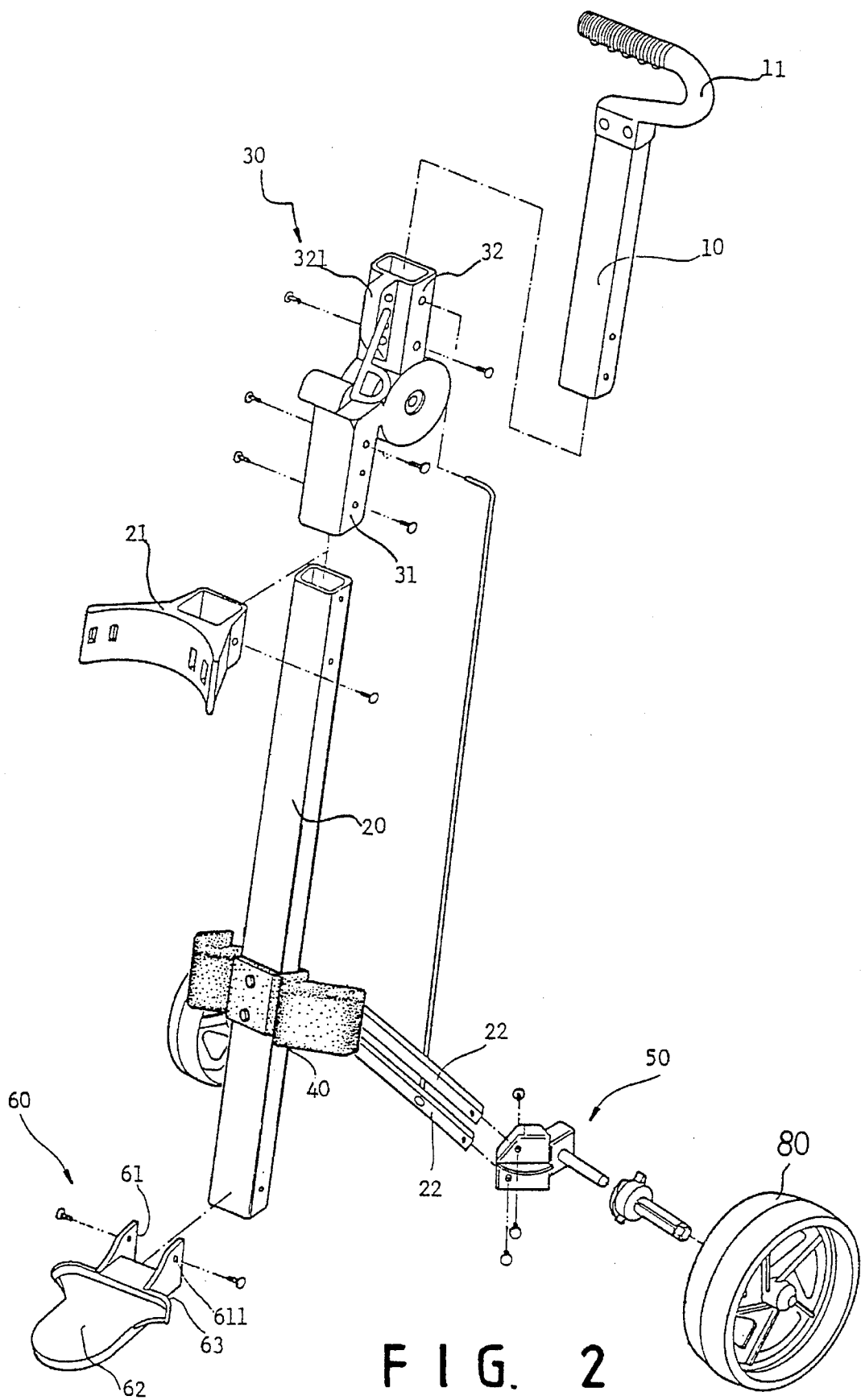
FIG. 2 is an exploded view of the golf cart.

Referring to the drawings and in particular to FIGS. 1 and 2 thereof, the golf cart according to the present invention mainly comprises an upper rod 10, a lower rod 20, a pivot joint 30, a fixed seat 40, two axle members 50, a supporting seat 60, and two wheels 80.

Figure 3:
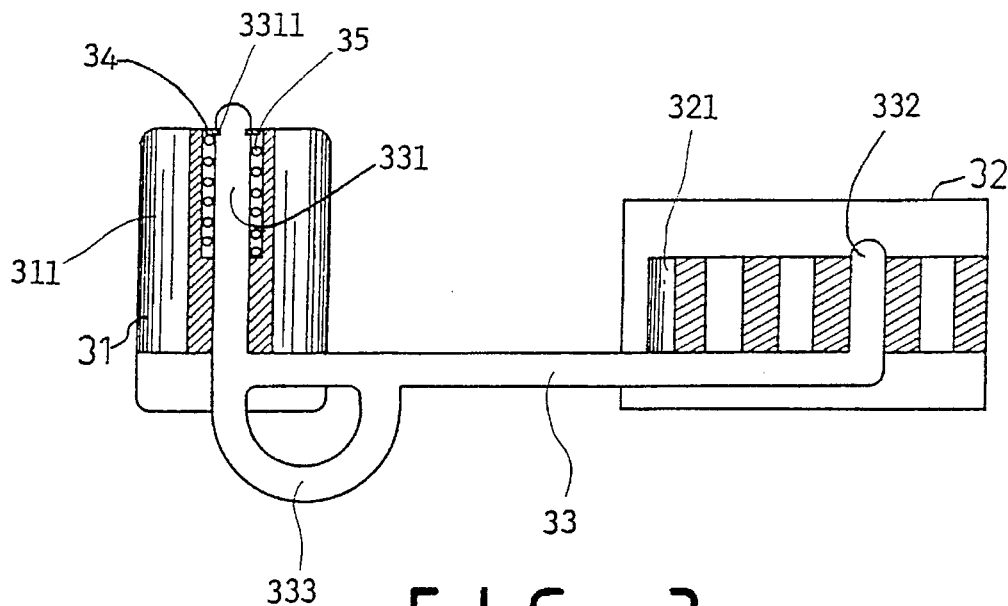
FIG. 3 is a cutaway view of FIG. 1, showing the engagement between the U-shaped rod and the upper member and the lower member.
Figure 4:
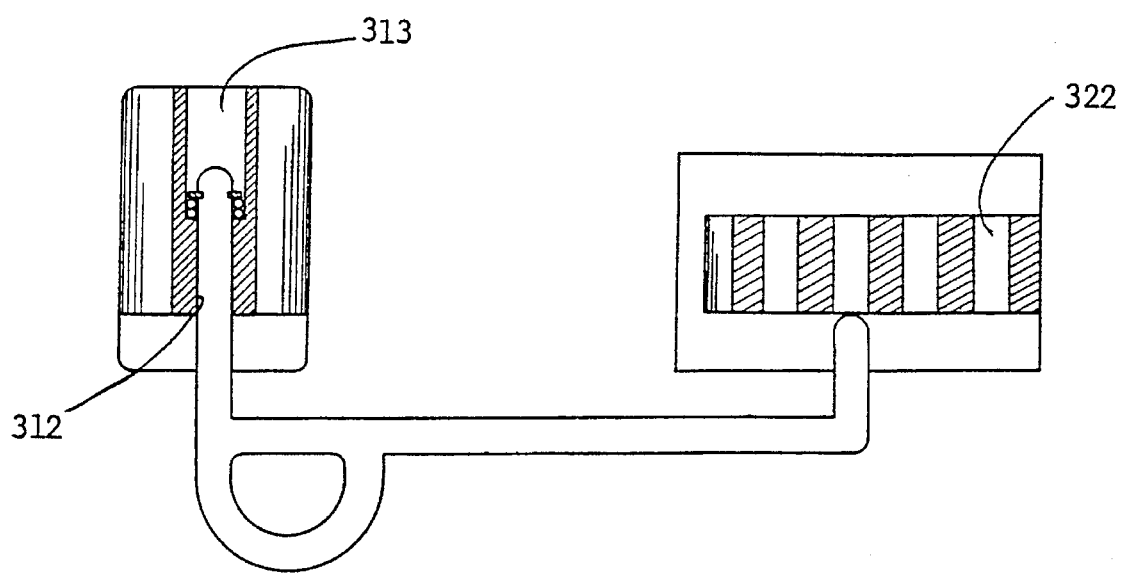
FIG. 4 is a cutaway view of FIG. 1, showing the way to adjust the height of the handle grip.
Figure 5:
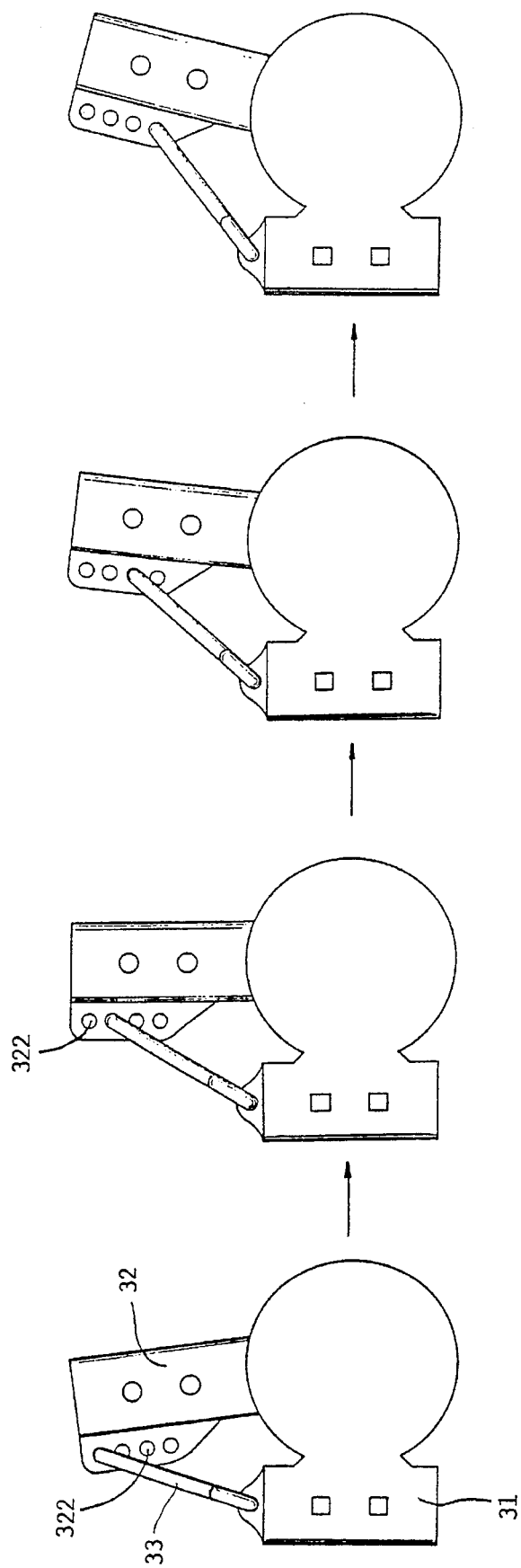
FIG. 5 shows the working principle of the pivot joint.

The upper rod 10 is provided with a handle grip 11 at the upper end and engaged with the pivot joint 30 at the lower end. The lower rod 20 is engaged with the pivot joint 30 at the upper end. The pivot joint 30 is composed of a lower member 31, an upper member 32 and a U-shaped rod 33 (see FIGS. 3, 4 and 5). The lower member 31 is provided with an engaging portion 311 in which there is a through hole 312 and a chamber 313 with a diameter slightly larger that of the hole 312, while the upper member 32 has a flanged wall 321 with a plurality of holes 322. The U-shaped rod 33 includes a long end 331, a short end 332 and a loop 333 for the passage of a finger between the long end 331 and the short end 332. At the tip of the long end 331 of the U-shaped rod 33 there is a groove 3311 for engaging with a C-ring 34 so as to keep a compressed spring 35 in the chamber 313 of the lower member 31. When desired to adjust the height of the handle grip 11, it is only necessary to pull up the loop 333 as far as possible from the lower member 32 so as to slide the short end 332 out of the hole 322. Then, the handle grip 11 is adjusted to an appropriate position, the loop 333 is released thereby causing the compressed spring 35 to recover, and the short end 332 is inserted into another hole 322, whereby the handle grip 11 is adjusted to a desired position. When desired to collapse the golf cart for stowage, it is only necessary to pull up the loop 333 and turn the upper member 32 through an angle of 180 degrees so as to collapse the upper rod 10, the handle grip 11 and the lower rod 20 together. A seat 21 is fixedly locked on the bottom of the lower member 31 for supporting a golf bag.

Figure 6:
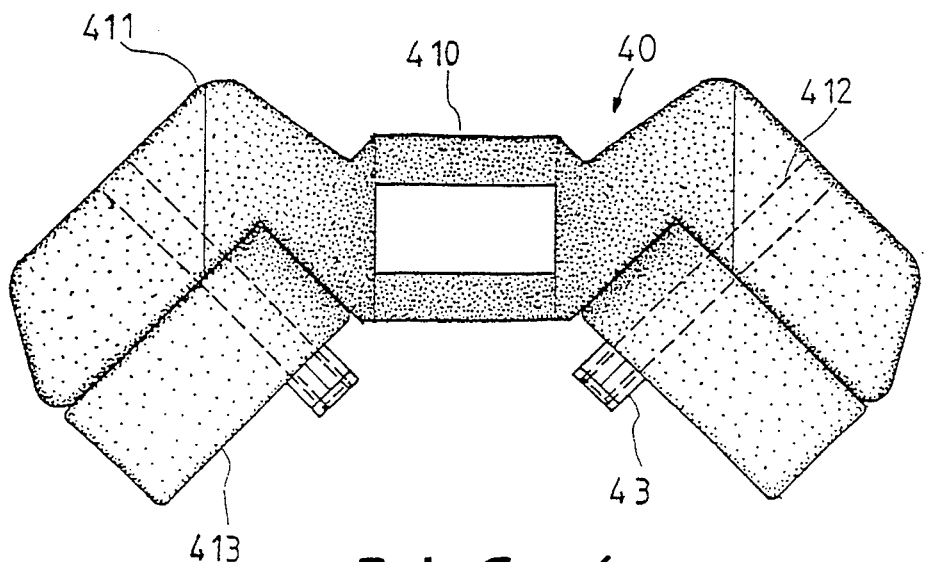
FIG. 6 is a top view of the fixed seat.
Figure 7:
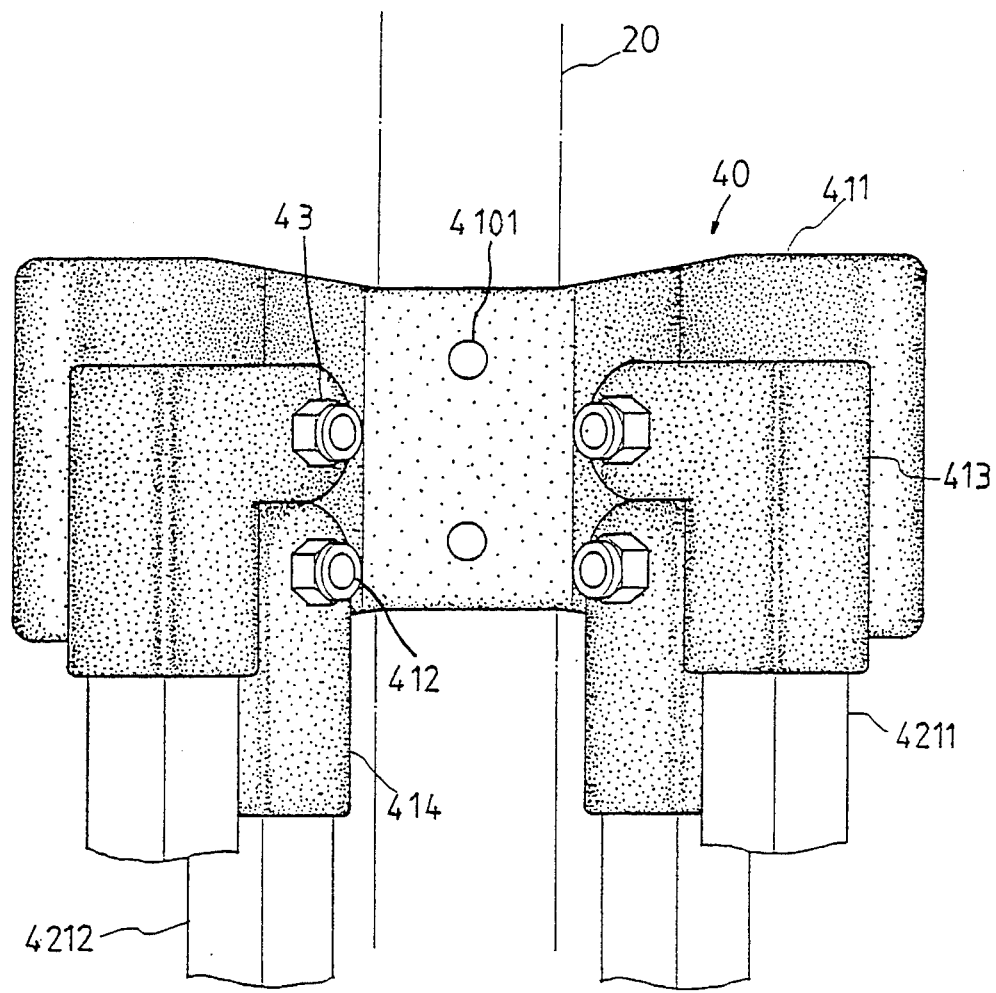
FIG. 7 is a front view of the fixed seat.

On the lower rod 20 there is the fixed seat 40 pivotally connected with two levers 4211 and 4212. As shown in FIGS. 6, 7 and 8, the fixed seat 40 includes an integral body 41 having a rectangular portion formed with a vertical opening 410 for receiving the lower rod 20 and two L-shaped wings 411 one at a side thereof. Two transverse holes 4101 extend through the rectangular portion of the integral body 41 so that the fixed seat 40 can be locked on a lower end of the lower rod 20. Each of the L-shaped wings 411 is provided with two bolts 412, the upper one of which extends through a hole 4131 of a L-shaped connector 413 to engage with a nut 43 and the lower one of which through a hole 4141 of a straight connector 414 to engage with a nut 43. The L-shaped connector 413 and the straight connector 414 are fixedly mounted on the upper ends of the levers 4211 and 4212, respectively. Hence, the levers 4211 and 4212 can be rotated with respect to the corresponding bolts 412.

Figure 9:
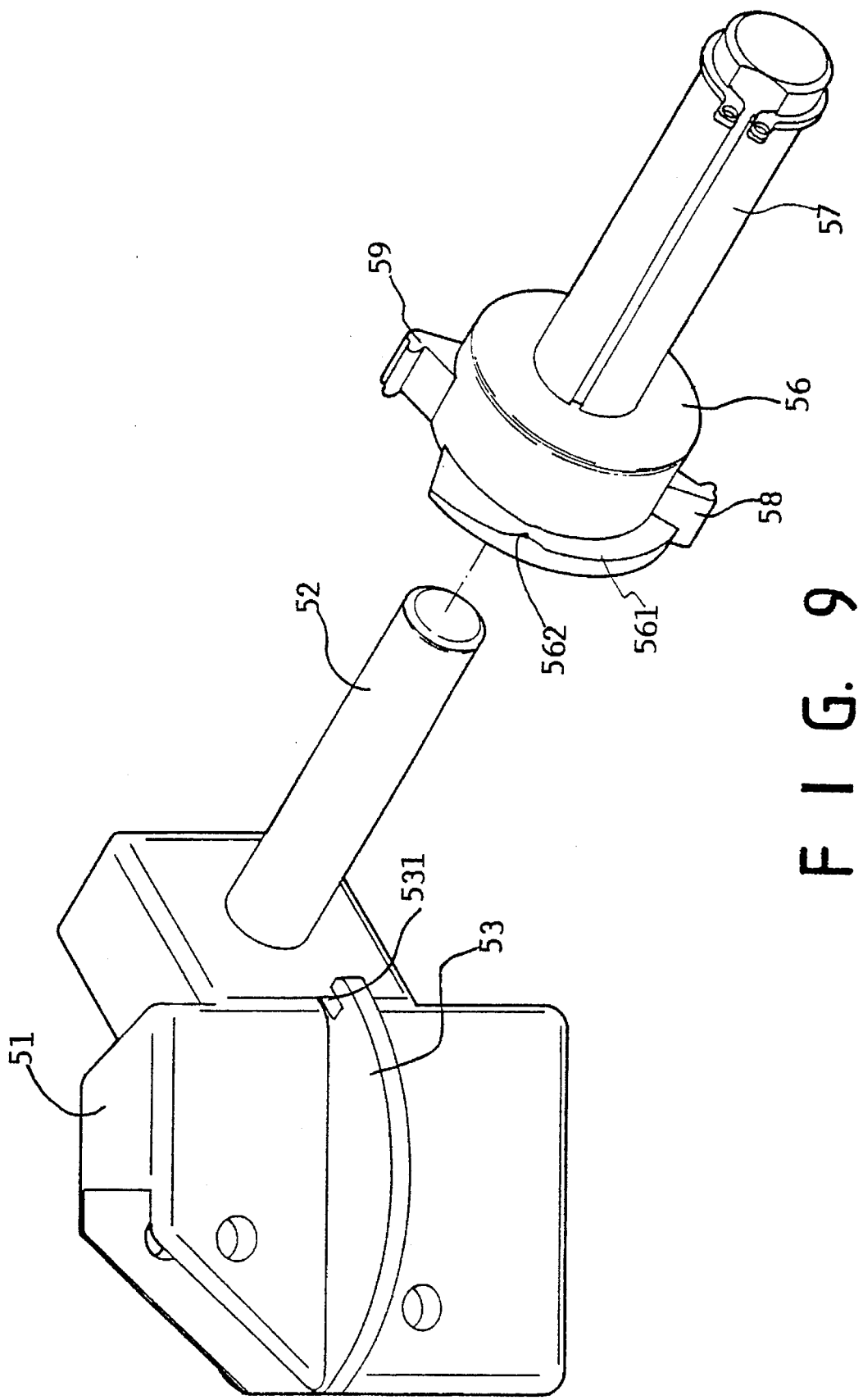
FIG. 9 is an exploded view of the axle member.
Figure 10:
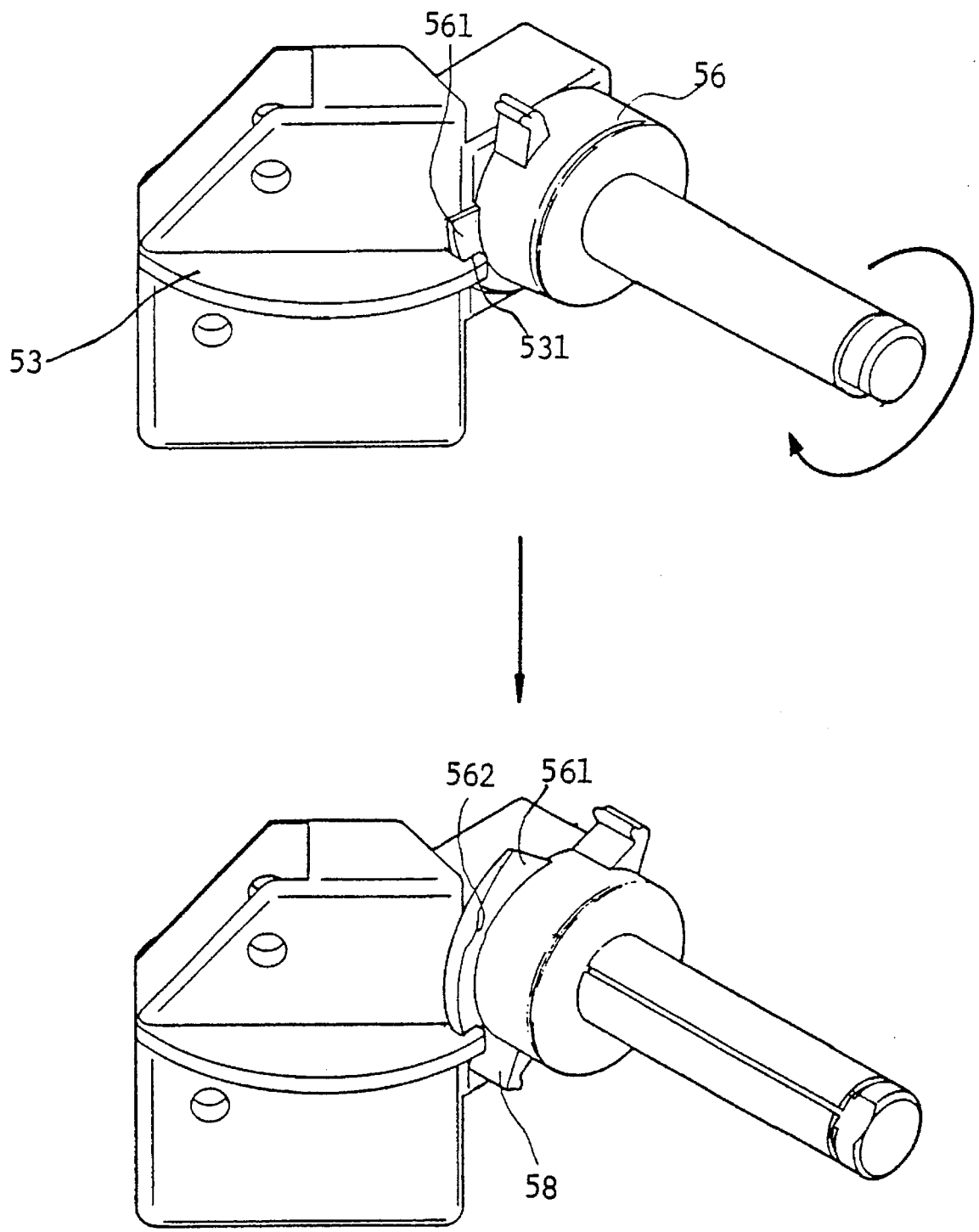
FIG. 10 shows the working principle of the axle member.

The levers 4211 and 4212 are each connected to a wheel 80 via an axle member 50 (as shown in FIGS. 9 and 10) and has a pivot seat 51 on which there is a shaft 52, a reinforcing plate 53, a plurality of reinforcing ribs and a cylindrical portion 56. The reinforcing plate 53 has a notch 531 while the cylindrical portion 56 is provided with a sleeve 57. Further the cylindrical portion 56 has two protuberances 58 and 59 and a curved rib 561 with a flange 562. As the width of the flange 562 is slightly larger than the depth of the notch 531, the flange 562 may be forced fitted into the notch 531.

When the sleeve 57 is engaged with the shaft 52, the clearance between the pivot seat 51 and the wheel 80 just enables the passage of a user's finger to rotate the protuberances 58 and 59 and the notch 531 is engaged with the curved rib 561.

A supporting seat 60 which is integrally made is fixedly mounted on the lower end of the lower rod 20 and has two webs with a threaded hole 611 for engaging with the lower rod 20. The supporting seat 60 further has a horseshoe shaped receiving plate 62 and a curved stop 63 between the web 61 and the receiving plate 62 for supporting the golf bag.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A golf cart comprising:

an upper rod with a handle grip;

a pivot joint including an upper member, a lower member and a U-shaped rod, said lower member being provided with an engaging portion in which there is a through hole and a chamber with a diameter slightly larger than said through hole, said upper member having a flanged wall with a plurality of holes, said U-shaped rod having a long end, a short end and a loop for passage of a finger between said long end and said short end, said long end having a groove for engaging with a C-ring so as to keep a compressed spring in the chamber of said lower member;

a lower rod locked into said pivot joint;

a fixed seat including an integral body having a rectangular portion formed with a vertical opening for fixedly engaging a lower end of said lower rod, said fixed seat having at both sides an L-shaped wing provided with two transverse bolts, one of said bolts extending through a first hole of an L-shaped connector to engage with a first nut, another one of said bolts extending through a second hole of a straight connector to engage with a second nut, said L-shaped connector being fixedly mounted on an upper end of a first lever, said straight connector being fixedly mounted on an upper of a second lever;

an axle member connected to said first and second levers and having a pivot seat on which there is a shaft, a reinforcing plate, and a cylindrical portion, wherein said reinforcing plate has a notch and said cylindrical portion is provided with a sleeve, two protuberances and a curved rib with a flange; and a supporting seat fixedly mounted on a lower end of the lower rod and having two webs with a threaded hole for engaging the lower rod, a horseshoe shaped receiving plate and a curved stop between the web and the receiving plate.

\* \* \* \* \*